United States Patent [19]

Feldman et al.

[11] 4,441,288
[45] Apr. 10, 1984

[54] BREAK-AWAY SECTIONALIZED DRIVEN ROD

[75] Inventors: Gilbert J. Feldman; Richard A. Feldman, both of Tucson, Ariz.

[73] Assignee: Allied Surveyor Supplies Mfg. Company, Tucson, Ariz.

[21] Appl. No.: 315,254

[22] Filed: Oct. 26, 1981

[51] Int. Cl.³ .............................................. E01F 9/02
[52] U.S. Cl. ...................................... 52/103; 52/726; 52/585
[58] Field of Search ................. 52/103, 104, 105, 156, 52/585, 726, 152–154, 165; 33/293, 297

[56] References Cited

U.S. PATENT DOCUMENTS

| | | | |
|---|---|---|---|
| 825,069 | 7/1906 | Peirce | 52/585 |
| 2,527,681 | 10/1950 | Lewis et al. | 52/103 |
| 3,377,765 | 4/1968 | Greeley | 52/726 |
| 3,437,059 | 4/1969 | Stonier et al. | 52/726 |
| 4,087,945 | 5/1978 | Berntsen et al. | 52/103 |
| 4,254,597 | 3/1981 | Feldman et al. | 52/103 |

FOREIGN PATENT DOCUMENTS 249200  10/1960  Australia ................................ 52/156

*Primary Examiner*—James L. Ridgill, Jr.
*Attorney, Agent, or Firm*—LaValle D. Ptak

[57] ABSTRACT

A sectionalized attachable rod survey monument of the type which is driven into the ground has a lower anchor pilot rod section and an upper rod section made of a solid aluminum alloy. An axial hole is drilled in the upper end of the pilot rod section and the lower end of the upper rod section to accept a stainless steel roll pin, and the two rods are separated by a stainless steel spacer washer. The spring pin becomes compressed when it is inserted into the holes in the ends of the rods and holds them together. The rods cannot physically be pulled apart under normal use; but when the upper rod is mechanically disturbed, such as when it is hit by road equipment or vandalized, the rods separate from one another. A permanent magnet is carried in the bottom of the hole in the lower pilot rod to permit detection of the marker location whenever the upper rod does become separated from the lower pilot rod. By using stainless steel for the spring pin and the spacer washer, metallurgical fusion between the two rod sections is prevented; so that they may be separated even after they have been in the ground for a considerable length of time.

8 Claims, 5 Drawing Figures

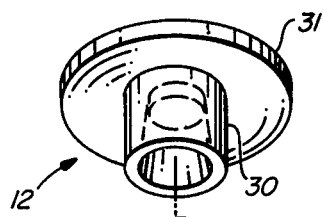
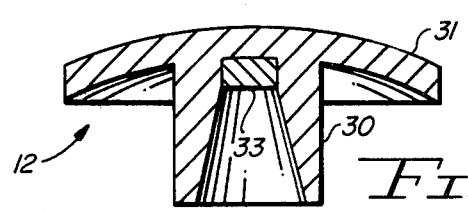
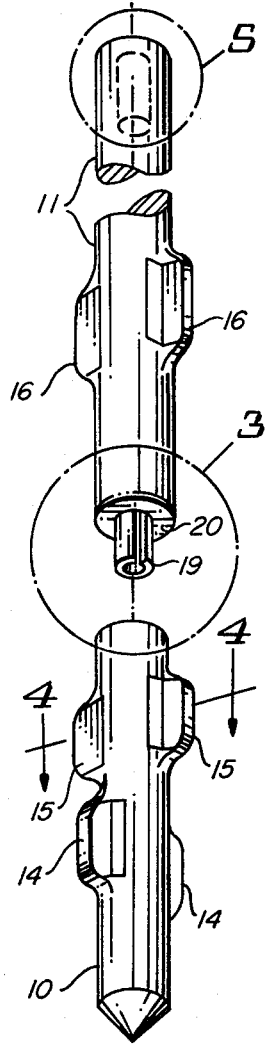
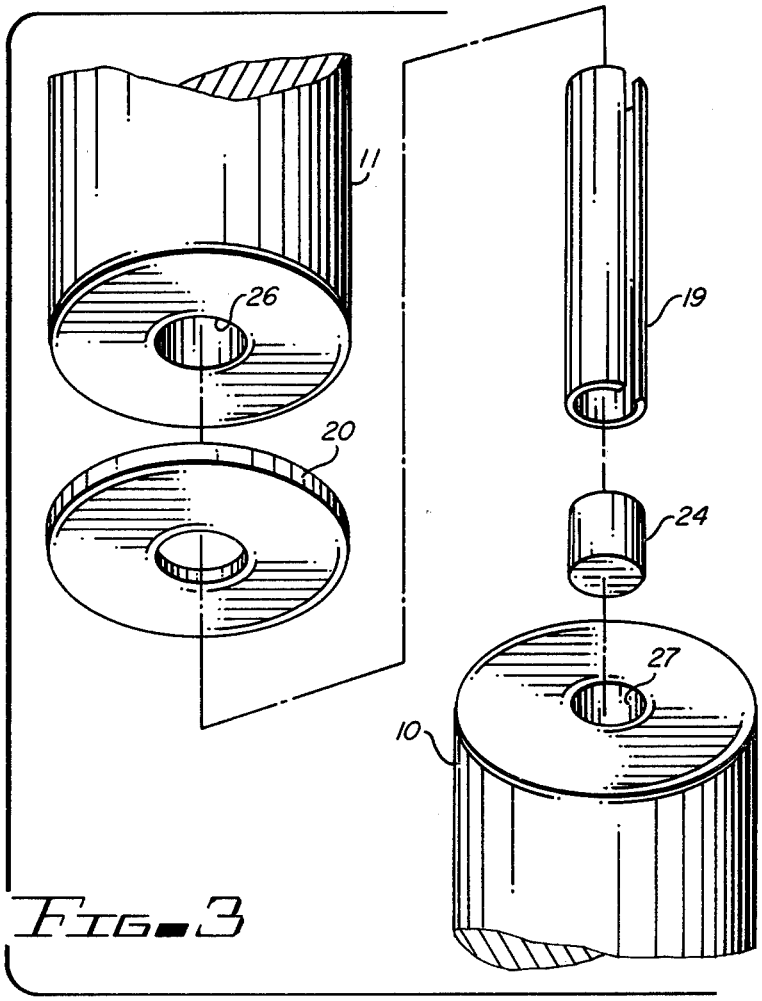
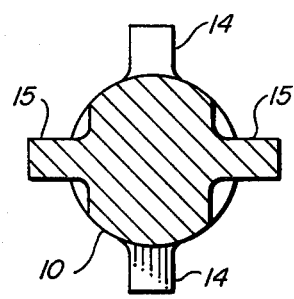
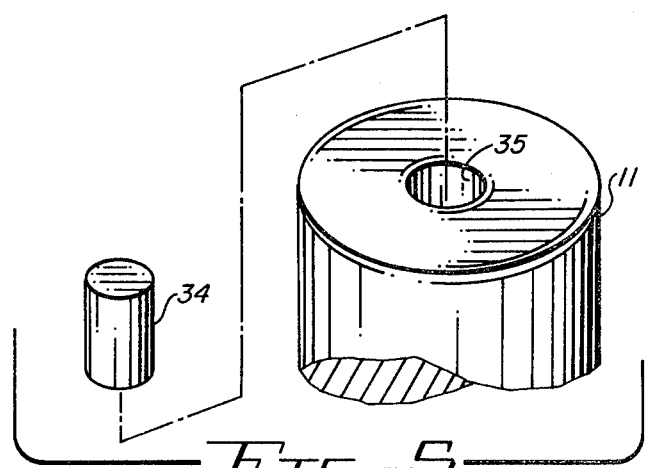

BREAK-AWAY SECTIONALIZED DRIVEN ROD

BACKGROUND OF THE INVENTION

Impact driven survey monuments made of various materials, such as aluminum, aluminum alloys, or stainless steel, are widely used. These monuments vary in length depending upon the particular characteristics of the ground in which they are used. In some areas requiring relatively deep penetration, sectionalized driven rod monuments, such as disclosed in the patents to Feldman et al, U.S. Pat. No. 4,254,597, and Berntsen, U.S. Pat. No. 4,087,945, are necessary. The sectionalized rods disclosed in these two patents both rotate the rod sections as the monument is driven into the ground to maintain a tight connection between the rod sections and a threaded connector used to interconnect adjacent sections.

Another sectionalized rod monument in which the sections are threaded together is disclosed in the patent to Baumeister, U.S. Pat. No. 3,378,967. The Baumeister device, however, does not include any provision for rotating the sections relative to one another to maintain the threaded interconnection tight as the monument is driven into the ground.

Other types of monuments which are adapted to be buried in the ground in a hole which then is backfilled around the monument also exist. Such monuments range in variety and style from cylindrical tubular monuments, concrete posts, cast iron monuments, cast aluminum, and other types. Many of these prior art monuments are unnecessarily heavy and cumbersome. In addition, many of the prior art monuments are expensive to manufacture and install, which makes them undesirable for wide scale use.

Whenever a maker is used in a location having a relatively high public density, the marker is prone to premature removal or vandalism. Furthermore, markers often are struck by bulldozers, plows, or other equipment operating in the area of the marker. Whether the marker is struck by a bulldozer or is vandalized, the result usually is to bend or move the marker or to totally remove it. This makes it unclear where the original exact survey point marked by the marker is located. If the marker is easy to remove and relocate, it obviously fails to provide the reliability of information concerning the survey point which is intended by the original placement of the marker.

To overcome the problem of movement or removal of markers, various types of break-away monuments have been developed. Monuments of this nature which are typical of the prior art are disclosed in the patents to Berntsen, U.S. Pat. No. 3,748,795, Johnson, U.S. Pat. No. 3,685,237, and Johnson, U.S. Pat. No. 3,899,856. The monument disclosed in the Berntsen '795 patent is a relatively bulky casting of an aluminum alloy having a magnet placed in it near the base and having two intersecting undulating webs connecting the top and base flanges of the monument. At intervals throughout the vertical length of the monument, the webs have transverse lines of weaknesses formed in them. Thus, if the monument is struck at its upper end, the lines of weaknesses are such that the monument will break off at one of these weakness lines to maintain the base in an undisturbed condition, even though the upper part of the monument is moved or totally removed. The magnet which remains attached to the base then facilitates location of the survey point identified by the marker. Even though the marker is made of an aluminum alloy, it is relatively heavy, it requires the digging of a hole prior to its placement, and it is bulky.

The Johnson U.S. Pat. No. 3,685,237, illustrates another prior art construction for a breakaway-type of monument construction. The marker disclosed in this patent is cast iron in the shape of alternate orthoginal thin plates. These plates are designed to fracture whenever transverse external forces are applied to the upper part of the marker. The intent is that at least the lower portion of the marker will remain in place at the survey point for subsequent location. As with the Berntsen marker, it is necessary first to dig a hole in the ground to bury the marker in its installation. Although this type of installation is utilized in many locations, it is a cumbersome one. In addition, because the marker is made from a casting, the manufacturing process necessarily is more expensive than a marker formed from a tube or a rod. Also, since the maker is made of cast iron, it is relatively heavy which further limits the locations in which the marker may be employed and creates additional expenses in transporting of the marker from its place of manufacture and from place to place for installation.

The marker disclosed in the Johnson U.S. Pat. No. 3,899,856, is designed to be driven into the ground; so that it is not subject to the disadvantages of the above-mentioned Berntsen '795 and Johnson '237 markers requiring the digging of holes. The marker of the Johnson '856 patent, however, still is made of two intersecting planar cast iron sections; so that it is relatively heavy and bulky. In addition, it requires a casting process for its manufacture. The marker has a number of slots or fracture zones formed at spaced intervals along its length and is made of brittle cast iron; so that it will crack-off or break at one of these fracture zones whenever the upper end of the marker is subjected to a strong transverse force. In this respect, its function is similar to the breakaway function disclosed in the Bernsten U.S. Pat. No. 3,748,795, and the Johnson Pat. No. 3,685,237.

It is desirable to provide a breakaway or detachable monument which overcomes the disadvantages of the various prior art structures discussed above, and which is simple to install.

SUMMARY OF THE INVENTION

Accordingly, it is an object of this invention to provide an improved breakaway monument.

It is an additional object of this invention to provide an improved sectionalized detachable monument.

It is another object of this invention to provide an improved impact-driven sectionalized detachable monument.

It is a further object of this invention to provide a detachable driven rod monument having at least two sections interconnected in a manner to permit the upper section to pull-away from the lower section if the upper section is disturbed by vandalism, road equipment, or the like.

In accordance with a preferred embodiment of the invention, a detachable rod survey monument which is adapted to be driven into the ground is made of at least first and second elongated cylindrical rod sections. At least the upper end of the first rod section and the lower end of the second rod section have an axial hole extending to a predetermined depth in them. A spring pin and spacer washer made of a material which prohibit metallurgical fusion between the rod sections and between the rod sections and the spring pin or the spacer washer are used to interconnect the two rod sections. The sections are separated by the spacer washer and are interconnected by the spring pin extending into the holes formed in the rod sections. The lower end of the first rod section then is terminated by a penetrating point to facilitate its movement into the ground.

BRIEF DESCRIPTION OF THE DRAWING

FIG. 1 is an exploded perspective view of a preferred embodiment of the invention;

FIG. 2 is a sectional view of a portion of the embodiment shown in FIG. 1;

FIG. 3 is an enlarged exploded perspective view illustrating additional details of a portion of the embodiment shown in FIG. 1;

FIG. 4 is a sectional view taken along the line 4—4 of FIG. 1; and

FIG. 5 is an enlarged exploded perspective view of an alternative construction which may be used in conjunction with the embodiment shown in FIG. 1.

DETAILED DESCRIPTION

Reference now should be made to the drawing in which the same or similar reference numbers are used throughout the different Figures to designate the same or similar components. The detachable or breakaway driven rod monument shown in the various Figures of the drawing is designed for applications where a survey marker or survey monument is required in a high public density area. In such locations, it has been found that survey monuments are prone to premature removal or destruction. By providing the detachable monument construction which is illustrated in the embodiment shown in the various Figures of the drawing, the survey point marked by the monument is retained even though road equipment, farm equipment, or vandalism moves or completely pulls away the upper portion of the monument from the lower portion. As a consequence, the location of the survey point later can be found with a magnetic locator for a minimum expense of time and money compared to resurveying the general area to locate the survey point.

To accomplish the purpose outlined above, the monument is formed of at least two section 10 and 11. These sections typically are three-fourths inch ($\frac{3}{4}''$) diameter aluminum or aluminum alloy rods and are capped with a cold forged aluminum or aluminum alloy cap 12 which is metallurgically matched with the rod 11 to ensure ultimate fusion between the rod 11 and the cap 12 when the cap is driven onto the end of the rod 11. The cap preferably is of the type disclosed in U.S. Pat. No. 3,174,588.

To facilitate straight line penetration when the monument is driven into the ground, the lower-most section 10 has a conical penetrating point formed on it. This point is clearly shown in FIG. 1. The lower or pilot rod section 10 also has two pairs of outwardly extending flutes 14 and 15 formed on the section 10. The flutes of each pair are located on opposite sides of the rod section 10, and the flutes 14 and 15 are machine-pressed out of the main body portion of the rod section 10. The flutes themselves are aligned with the axis of the rod section 10 to assist in straight line penetration of the section 10 as it is driven into the ground. Once the monument is in place, the flutes 14 and 15 function to inhibit rotation of the monument.

Each of the flutes of the pairs 14 and 15 typically have a length on the order of one and one-half inches ($1\frac{1}{2}''$), with the width across the pair being approximately one ane one-eighth inches ($1\frac{1}{8}''$) (when the rod 10 is a $\frac{3}{4}''$ diameter rod). The lower-most flute pair 14 is located approximately two inches above the point on the lower end of the rod 10. The pilot point on the end of the rod serves to break or penetrate semi-hard ground substrates before contact by the lower-most pair of flutes 14, which protects the flutes from damage and enables the rod to be driven straight and securely into the ground.

A similar pair of flutes 16 is located on the upper rod section 11, and the individual flutes of the pair 16 are formed in the same manner by machine pressing as the flutes 14 and 15 are formed out of the rod section 10.

FIG. 3 shows in greater detail the manner in which the two rod sections 10 and 11 are interconnected; so that they may be subsequently detached if the upper section 11 is subjected to a substantial transverse force. Cylindrical holes 26 and 27 are drilled on the axes, respectively, of the lower end of the upper rod section 11 and the upper end of the lower rod section 10 to a depth of approximately $\frac{7}{8}''$. In the embodiment under discussion, using a $\frac{3}{4}''$ diameter aluminum rod for the sections 10 and 11, the holes 26 and 27 have a diameter of 5/16''.

A stainless steel washer 20, having an outside diameter approximately equal to the outside diameter of the rods 10 and 11 and having a hole through it which is of a diameter equal to or greater than the diameter of the holes 26 and 27, is placed between the two rod sections 10 and 11 and over the outside of a stainless steel roll spring pin 19. The spring pin 19 is of conventional construction and has a generally "C" shaped cross-sectional configuration formed by a slot extending throughout the length of the pin 19. The details of the construction of the pin 19 are shown most clearly in FIG. 3. The compressed outside diameter of the roll spring pin 19 is selected to be the same as or slightly less than the inside diameter of the holes 26 and 27 (in the present case 5/16''). In its unstressed condition, however, the pin 19 assumes a greater outside diameter. As a result, when the spring pin 19 is inserted into the holes 26 and 27 with the washer 20 between the ends of the sections 10 and 11, the spring pin is compressed and holds the two rod sections 10 and 11 tightly together.

Before insertion of the spring pin 19 into the lower section 10, a permanent magnet 24 is inserted into the hole 27 beneath the lower end of the spring pin 19. Consequently, if the upper rod section 11 ever should be separated from the lower section 10, location of the survey point marked by the lower section 10 may be accomplished by means of a magnetic detector which will respond to the magnetic field produced by the magnet 24.

Once the magnet 24 and the washer 20 are in place and the pin 19 is inserted through the hole in the washer 20 and into the holes 26 and 27, the two rod sections 10 and 11 are forced into tight engagement on opposite sides of the washer 20. This forms a rigid penetrating rod assembly which then is driven into the ground in any suitable manner. Once the monument is fully driven to its desired depth, the cap 12 is pounded onto the upper end of the rod 11 which, because of the tapered inner opening of the cap on the cylindrical extension 30 thereof, causes it to be tightly fused together onto the upper end of the rod 11. The upper surface of the cap 31 may be either domed, as shown in FIG. 2, or flat, as desired. Generally, appropriate markings identifying the survey point are stamped into the cap either prior to its installation on the end of the rod or after it is installed in place.

Since the upper end of the monument which is topped by the cap 12 also may become buried or obscured by undergrowth, a magnet 33 generally is epoxied into place on the inside of the cap at the upper end of the cavity in the portion 30. This, again, assists in the location of the monument in the event it does become obscured from visual observation. An alternative location for the upper magnet is illustrated in FIG. 5, which is an expanded perspective view of the upper end of the rod 11. An axial cylindrical hole 35 may be formed in the upper end of the rod 11 if desired to accomodate a cylindrical permanent magnet 34 prior to the application of the cap 12 to the top of the monument. The magnet 34 then serves the sam purpose as the magnet 33, which is illustrated in FIG. 2, to facilitate the location of the monument.

The flutes 14, 15 and 16 all act to inhibit rotation of the monument sections 10 and 11 once the monument is driven into place. They extend outwardly from the main body of the sections 10 and 11, as most clearly indicated in the cross-sectional view shown in FIG. 4 of the lower rod section 10. In addition, the upper edges of the pairs of flutes 14 and 15 on the lower section impede vertical removal of the lower section from the ground if an effort is made to do so by lifting up on the upper section 11. If construction equipment, farm equipment, or vandals should somehow seriously disturb the upper end of the rod section 11 in a manner to displace it either vertically or transversely, the two sections 11 and 12 separate from one another by the slipping out of the spring pin 19 from either the hole 27 in the lower-most section or the hole 26 in the upper-most section. The physical characteristics of the steel roll spring pin 19 with respect to the characteristics of the rods 10 and 11 and the size of the holes 26 and 27 are selected to cause this to happen when a displacing force is applied to the upper rod section 11.

By using a stainless steel made from a high nickle and chrome alloy for the spring pin 19 and the spacer washer 20, corrosion or oxidation between the aluminum or aluminum alloy rods 10 and 11 is prevented. Consequently, the rods do not fuse to one another or to the spring pin 19 or washer 20 since there is no metallurgical fusion between similar metals by using the construction which is shown and which is described above. Thus, if the upper rod section 11 is displaced or totally removed, the lower rod section 10 remains in place at the survey point. It subsequently can be located by means of a magnetic detector responding to the magnet 24 located in the bottom of the hole 27 in the lower rod section 10. The rod section 10 serves as an anchor rod for the survey monument.

Although the foregoing description has been made in conjunction with a preferred commercial embodiment of the invention, it will be understood by those skilled in the art that various modifications and changes can be made without departing from the true scope of the invention. For example, the number and configuration of the flutes 14, 15 and 16 may be varied, and separate penetrating points instead of the intregal penetrating point on the lower end of the rod section 10 may be employed. In addition, the specific materials which have been described may be varied so long as metallurgical fusion between the rod sections and the pin and spacer is prevented. In addition, the magnets may be located in other locations besides the ones which have been illustrated, or the magnets may be eliminated, depending upon the particular application which is made of the detachable driven rod monument.

We claim:

1. A break-away rod survey monument adapted to be driven into the ground including in combination:
   first and second elongated cylindrical rod sections, with at least the upper end of said first rod section and at least the lower end of said second rod section having a cylindrical hole extending to a predetermined depth therein along the axis thereof;
   a hollow cylindrical spring roll pin having a longitudinal slot therein and having an unstressed diameter which is slightly greater than the internal diameter of the cylindrical holes in said first and second rod sections for tightly but detachably connecting the upper end of said first rod section with the lower end of said second rod section in end-to-end relationship with said spring roll pin inserted into the holes in said rod sections, said spring roll pin pulling out of at least one of said rod sections in response to relative lateral displacement forces or axial pulling forces applied to said rod sections; and
   said first rod section having means for retaining it in the ground and being terminated by a penetrating point at the lower end thereof.

2. The combination according to claim 1 wherein the hole formed in the upper end of said first rod section is formed to a greater depth than the depth occupied by said spring pin and further including a permanent magnet placed in the hole in the upper end of said first rod section prior to the insertion of said spring pin therein during the assembly of said detachable rod survey monument.

3. The combination according to claim 1 wherein said first and second rod sections are solid cylindrical rod sections formed of aluminum and said pin is made of stainless steel.

4. The combination according to claim 1 further including a spacer washer placed between the upper end of said first rod section and the lower end of said second rod section and around said spring pin for preventing physical contact of said two rod sections with one another, said spacer washer formed of a material which prohibits metallurgical fusion between said first and second rod sections and between said rod sections and said spacer washer.

5. The combination according to claim 4 wherein said rod sections are solid cylindrical rod sections formed of aluminum, and said spacer washer and said spring pin are made of stainless steel.

6. The combination according to claim 5 wherein the point on the lower end of said first rod section is a conical point.

7. The combination according to claim 6 wherein said means for retaining said first rod section in the ground is at least one pair of spaced-apart flutes extending outwardly from the periphery thereof and aligned with the axis of said first rod section for preventing rotation of said monument when it is driven into the ground and when it is in place.

8. The combination according to claim 7 wherein said first rod section has two pairs of spaced-apart flutes aligned with the axis of said first rod section and each of said pairs of flutes are machine-pressed intermediate the point of said first rod section and its upper end, the flutes of each set being located 180 degrees apart on opposite sides of said first rod section with the two pairs positioned 90 degrees from one another.

* * * * *